United States Patent [19]
Blackburn

[11] Patent Number: 4,642,426
[45] Date of Patent: * Feb. 10, 1987

[54] APPARATUS FOR LOCATING FAULTS IN A CARRIER SUBSCRIBER COMMUNICATION SYSTEM

[75] Inventor: Tom L. Blackburn, San Jose, Calif.

[73] Assignee: GTE Communication Systems Corporation, Phoenix, Ariz.

[*] Notice: The portion of the term of this patent subsequent to Dec. 30, 2003 has been disclaimed.

[21] Appl. No.: 680,205

[22] Filed: Dec. 10, 1984

[51] Int. Cl.$^4$ ............................ H04B 1/60; H04B 3/46
[52] U.S. Cl. ................................. 370/13.1; 178/69 R; 178/69 G; 379/4
[58] Field of Search .................. 179/175.31 R, 115.3 F, 179/170 F; 370/13, 14, 15; 178/2 R, 2 C, 2 D, 3, 70 R, 69 R, 69 G

[56] References Cited

U.S. PATENT DOCUMENTS

| | | | |
|---|---|---|---|
| 3,904,827 | 9/1975 | Blok | 179/175.31 R |
| 3,909,563 | 9/1975 | Ghosh et al. | 179/175.31 R |
| 4,006,320 | 2/1977 | Märkl | 179/175.31 R |
| 4,025,737 | 5/1977 | Brewer | 179/175.31 R |
| 4,161,634 | 7/1979 | Bellisio | 179/175.31 R |
| 4,319,080 | 3/1982 | Kuwahara | 179/175.31 R |
| 4,355,215 | 10/1982 | Legras et al. | 179/175.31 R |

Primary Examiner—Stafford D. Schreyer
Attorney, Agent, or Firm—Russell A. Cannon; Douglas M. Gilbert

[57] ABSTRACT

Method and apparatus is disclosed for identifying faults in a subscriber carrier telephone system utilizing out-of-band pilot signals and comprising pluralities of cables and repeaters that are alternately connected in series between carrier equipment at a central office location and a subscriber station. Equipment at the office location transmits selected numbers of test pulses, having a test frequency that is between the transmitted and received channel and pilot frequencies, to the first cable. The pulses are detected at the first repeater and counted. A microprocessor is responsive to the test pulse count in the repeater for initiating associated tests on the cable and/or repeater, or for retransmitting test pulses onto the next cable to the next repeater for causing it to perform designated tests. The results of the tests are sent to the office equipment in the form of reply pulses having a frequency that is below the lowest channel frequency.

20 Claims, 4 Drawing Figures

APPARATUS FOR LOCATING FAULTS IN A CARRIER SUBSCRIBER COMMUNICATION SYSTEM

BACKGROUND OF INVENTION

This invention relates to telephone systems and more particularly to apparatus for locating faults in a carrier subscriber telephone system.

A typical carrier subscriber telephone system comprises carrier equipment that is normally collocated with central office telephone equipment at an office facility, a plurality of repeaters, and carrier subscriber equipment that is located at different subscriber stations or which is collocated at a cluster subscriber station. The repeaters are connected in series between the central office and station carrier equipment by means of associated cable sections which may be lengths of coaxial cable or twisted pair telephone cable.

In a computer controlled ten channel cluster carrier subscriber telephone system, carrier equipment at the central office location typically comprises apparatus for transmitting high frequency signals (e.g., channel frequencies between 92 and 148 kHz together with low and high frequency out-of-band pilot signals such as 88 kHz and 160 kHz), apparatus for receiving low frequency signals (e.g., channel frequencies between 12 kHz and 68 kHz), and a computer means for controlling the operation of the system. The repeaters operate to periodically increase the signal to noise ratio and integrity of carrier signals. All of the repeaters are preferably identical and comprise high and low frequency sections for passing office location signals to subscriber stations, and vice/versa. The high frequency repeater section essentially comprises a pair of 84–184 kHz high frequency filters flanking amplifier circuitry that passes signals only in the direction of the subscriber stations. Conversely, the low frequency repeater section comprises a pair of 8–72 kHz, for example, low frequency filters flanking amplifier circuitry that passes signals only in the direction of the office. Each repeater also comprises a microprocessor or microcomputer or other type of computer means that is responsive to control signals from the office computer for controlling the operation and/or characteristics of the repeater, e.g. the slope of the filter characteristics and the gain of the amplifiers.

From time to time, communication between the office and the cluster station may be faulty due to an entire or partial failure of one of the components in the repeater, damage to a cable, improper power supply voltage, or some other malfunction in the system. In order to avoid undue interruption of service for any of the above reasons, it is desirable to check the integrity and operation of the carrier subscriber system periodically for faults. It is also desirable to make such a check while the system is being operated in a normal communication mode. If a fault is found to exist, it is further desired to determine the location of the fault so that repair and/or preventative maintainence can be judiciously assigned and readily facilitated.

An object of this invention is the provision of improved apparatus for testing components of a carrier subscriber communication system.

Another object is the provision of improved apparatus for identifying and/or indicating the location of faults in components of carrier subscriber equipment.

Another object is the provision of apparatus for detecting and/or locating faults in a carrier subscriber communication system which utilizes existing system components, which requires few additional components, and which may be performed without interrupting normal use of the system.

SUMMARY OF INVENTION

In accordance with this invention, apparatus for checking for faults in a carrier subscriber communication system having office equipment which is connected in series with pluralities of series connected cables and repeaters and subscriber station terminal equipment, each of which repeaters is connected to one adjacent one of the cables at a first node and to another adjacent one of the cables at a second node, comprises: means collocated with the office equipment for transmitting a selected number of test pulses having a test frequency on a first cable to the first node at a first repeater that is closest to the office equipment; means in the first repeater for determining a first number of test pulses that are received at the first node thereof; first means in the first repeater for incrementing the first number of received test pulses by a first prescribed number to produce a second number of test pulses; first means in the first repeater for coupling a first predetermined number of reply pulses having a reply frequency to the first node of the first repeater for transmission on the first cable toward the office equipment if the second number of test pulses equals a second prescribed number for testing the integrity of the first cable; and means at the location of the office equipment for receiving any reply pulses transmitted over the first cable to the office location for indicating the status of the first cable under test. The apparatus may further comprise second means in the first repeater for incrementing the second number of test pulses by a third prescribed number to produce a third number of test pulses if the second number of test pulses is not equal to the second prescribed number; means in the first repeater for performing a predetermined test in the first repeater if the third number of test pulses is equal to a fourth prescribed number, which number may be equal to the second prescribed number; and second means in the first repeater for coupling a second predetermined number of reply pulses, which may be equal to said first predetermined number, to one of the first and second nodes of the first repeater for transmission over the first cable to the receiving means for indicating the results of the predetermined test; the receiving means being operative for determining the time of receipt and/or the number of reply pulses which are received thereby over the first cable for indicating the location of a fault, if any, in the first repeater and/or first cable. The apparatus may also comprise means in the first repeater for coupling M test pulses having the first frequency to the second node of the first repeater for transmission on a second cable to a first node of the adjacent-next repeater that is connected in series therewith if the third number of test pulses is not related to the fourth prescribed number, where M is related to the third number of test pulses.

BRIEF DESCRIPTION OF DRAWINGS

This invention will be more fully understood from the following detailed description of preferred embodiments thereof, together with the drawings in which.

DESCRIPTION OF PREFERRED EMBODIMENTS

Figure 1:
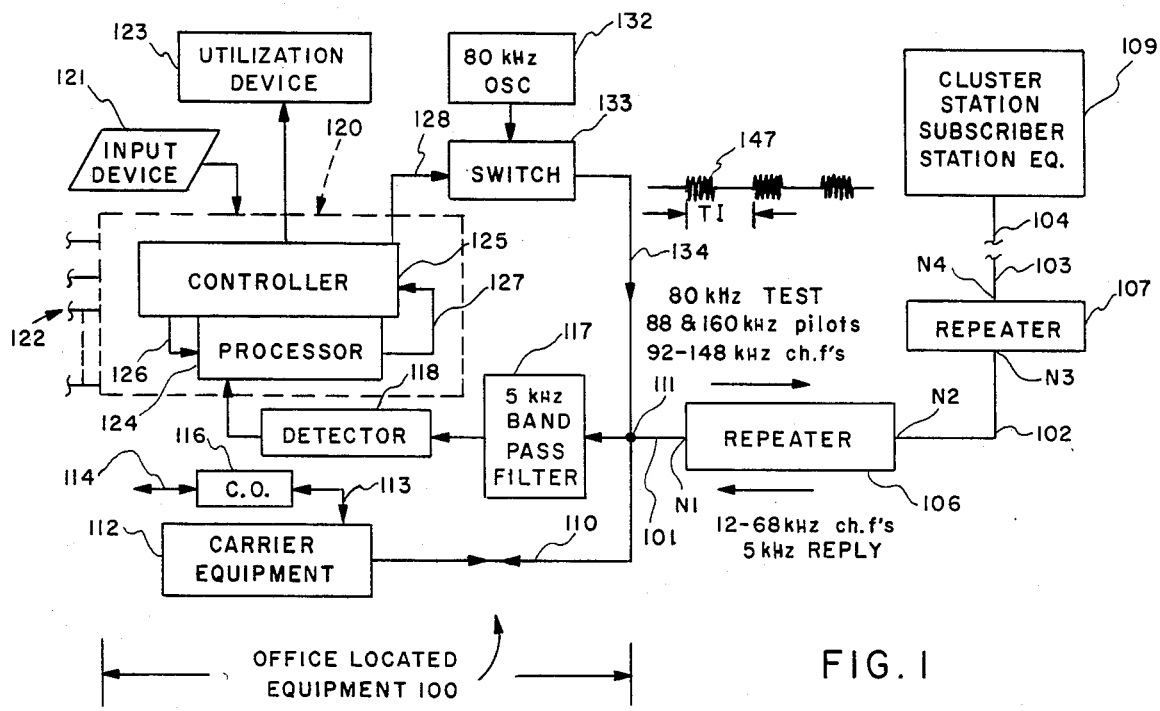
FIG. 1 is a schematic block diagram of a carrier subscriber telephone system embodying this invention.

Referring now to FIG. 1, a cluster station carrier subscriber telephone communication system embodying this invention generally comprises office located equipment 100, cables 101–104, repeaters 106 and 107, and cluster station carrier subscriber equipment 109. The equipment 100 generally comprises carrier equipment 112; a central office unit 116; a computer means 120 that is associated with an input device 121, switches 122, and a utilization device 123; an 80 kHz test frequency oscillator 132 and a switch means 133; and a 5 kHz bandpass filter 117 feeding a detector 118.

The carrier equipment 112 is operative for converting 10 each, for example, voice frequency signals on lines 113 from the central office unit 116 into associated carrier subscriber channels on line 110 that are in a 92–148 kHz band of carrier channel frequencies. The carrier equipment 112 also produces 88 and 160 kHz out of band pilot frequency signals on line 110 for transmission to the subscriber station 109. The carrier equipment 112 is also responsive to carrier subscriber channel signals from the equipment 109 that are in the frequency band of 12–68 kHz. The low frequency carrier channel signals are converted to associated voice frequency signals that are applied on lines 113 to the central office unit 116 which transmits them on lines 114 to other equipment (not shown).

The computer means 120 is operative for controlling the operation of the systems, including the repeaters, and for remotely testing the operation of the cables, repeaters and subscriber station equipment. The computer generally comprises a controller 125 and a signal processor 124 which is responsive to detected 5 kHz reply pulses on line 101. The controller may be caused to initiate testing of the system by manually actuating one of the switches 122 or by automatically programming the computer for performing a sequence of tests with the input device 121. The results of the tests, i.e., what units are faulty, are applied to a utilization device 123 which may be a display unit. The controller is operative during a test of a particular component for sequentially opening and closing the switch 133 a prescribed number of times for producing a sequence of 80 kHz test pulses 147 on line 134 which are transmitted on the first cable 101 in the direction of the repeaters. The carrier equipment 112 and detector 118 are not responsive to the test pulses since the 80 kHz test frequency is spaced apart from the channel and pilot frequency passbands and the low frequency passband of the filter 117. The test pulses are typically of 30 milliseconds duration with a 150 millisecond delay time between test pulses. Thus, the pulse period or test pulse time interval TI is 180 milliseconds.

Figure 2:
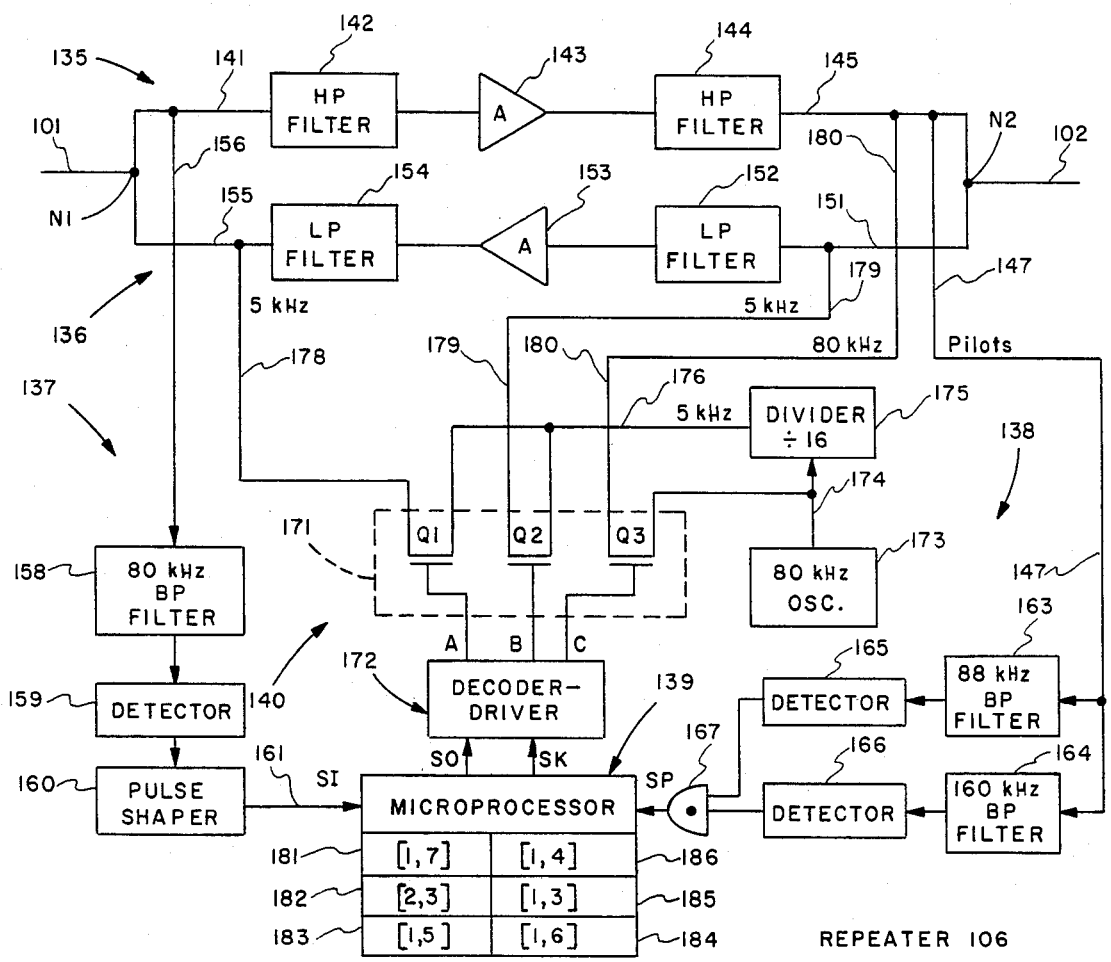
FIG. 2 is a schematic block diagram of the repeater 106 in FIG. 1.

Since all of the repeaters are substancially identical, only the repeater 106 will be described in detail. Referring now to FIG. 2, the repeater 106 comprises a high frequency section 135, a low frequency section 136, a test frequency detection circuit 137, a pilot frequency detection circuit 138, a microprocessor 139, and a test and reply pulse generator circuit 140. The high frequency section 135 comprises a one way amplifier 143 and a pair of high-pass filters 142 and 144 having 84–164 kHz passbands. The filters 142 and 144 pass the pilot and high channel frequencies from the carrier equipment 112 while blocking any low channel frequencies, 5 kHz reply pulses, and 80 kHz test pulses on the cables. Conversely, the low frequency section 136 comprises a one way amplifier 153 and a pair of low-pass filters 152 and 154 having an upper cutoff frequency of approximately 72 kHz for passing the low channel frequencies from the station equipment 109 and any 5 kHz reply pulses on the cables (as is described more fully hereinafter) while blocking the high frequency channel and pilot signals and 80 kHz test pulses.

The test frequency detection circuit 137 is connected on line 156 to a node or junction N1 of the input cable 101 and repeater 106, and comprises a narrow-band high-Q 80 kHz bandpass filter 158, a pulse detector circuit 159, and a pulse shaper circuit 160. Detected test pulses on line 161 comprise the SI input signal to the microprocessor 139.

The pilot detection circuit 138 is connected on line 147 to the node or junction N2 of the repeater and one end of the second cable 102. The pilot detection circuit comprises a pair of narrow-band high-Q 88 and 160 kHz bandpass filters 163 and 164 and associated pulse detector circuits 165 and 166, and an AND gate 167. The output signals of these detectors are high and low when the associated low and high frequency pilot signals are present and absent, respectively, at the node N2. The detected pilot signals are combined in AND gate 167 and applied as a logic signal SP to the processor 139.

The signal generator circuit 140 comprises a switch means 171 including a plurality of switching transistors Q1, Q2 and Q3; a decoder-driver circuit 172 for selectively driving ones of the switching transistors; and an oscillator 173 and divider circuit 175 which are operative for producing an 80 kHz test frequency signal on line 174 and a 5 kHz reply frequency signal on line 176. The switching transistors Q1 and Q2 are caused by the microprocessor to produce one or more 5 KHZ reply pulses on lines 178 and 179 that are applied to nodes N1 and N2, respectively. The switching transistor Q3 is caused by the microprocessor to produce designated numbers of 80 kHz test pulses on line 180 that are applied to the node N2 for transmission on the next cable 102 to the next repeater 107.

Figure 3A:
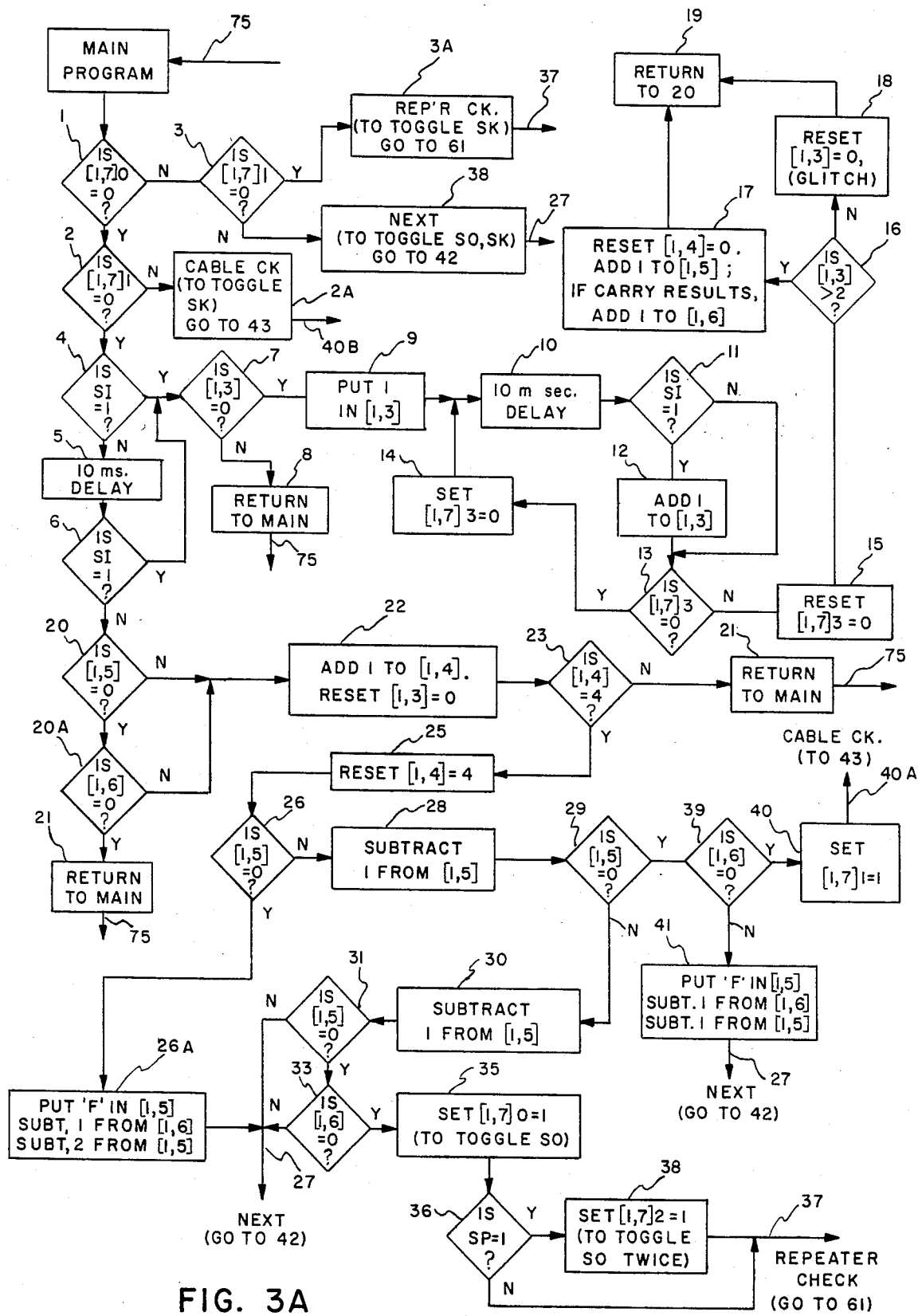
FIGS. 3A and 3B are a flow diagram of operation of the microprocessor in FIG. 2.
Figure 3B:
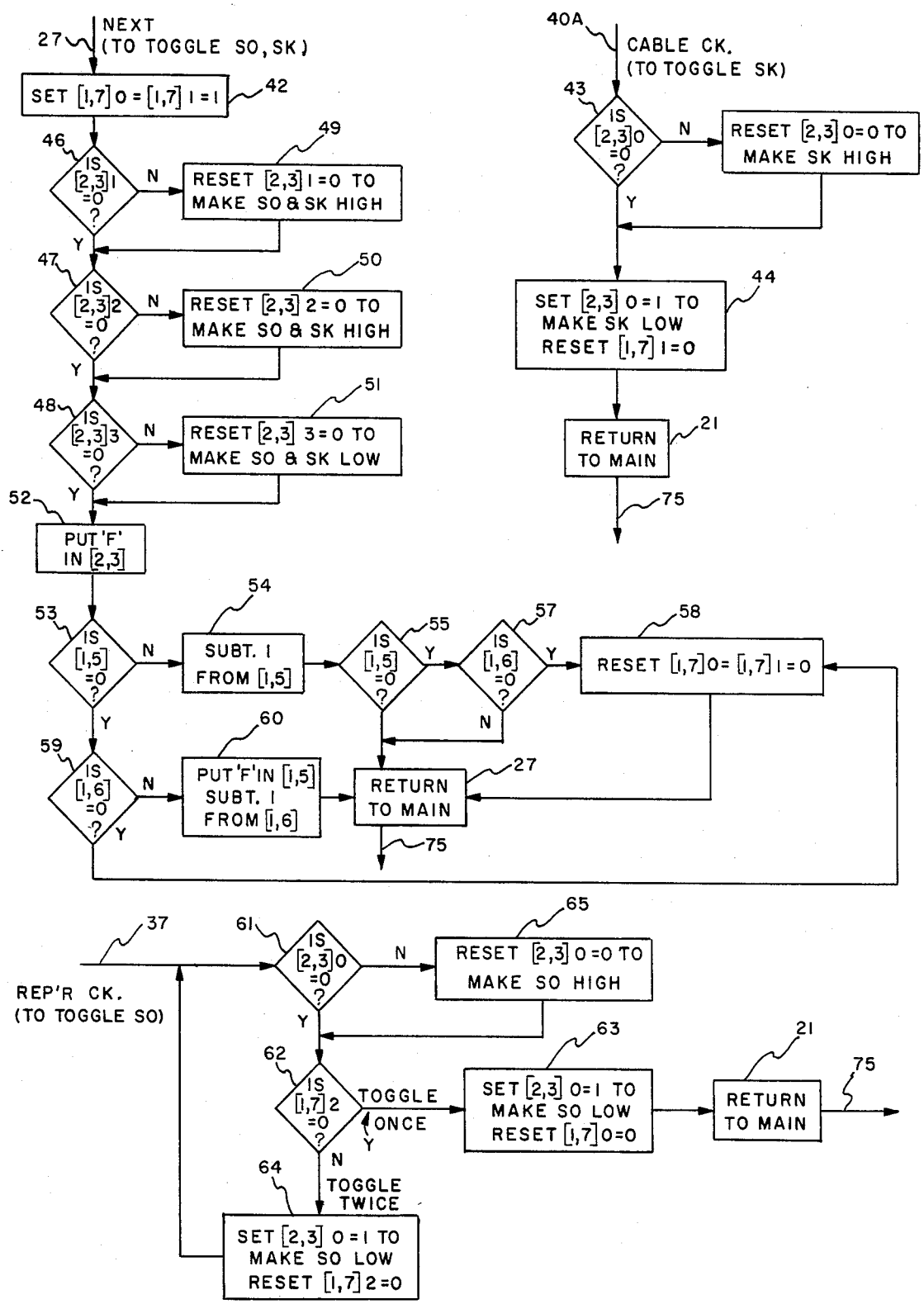

The microprocessor 139 operates in accordance with a stored program that is specified in FIGS. 3A and 3B for testing system components for faults in response to one or more detected test pulses on the SI input line 161. The microprocessor includes a plurality of registers 181–186 which are designated the [1,7], [2,3], [1,5], [1,6], [1,3], and [1,4] registers, respectively. The status of individual bits in or the full contents of various ones of these registers are periodically checked and/or incremented during the prescribed operation of the microprocessor in checking system components for faults.

All of the four bits of the [1,7] or operation register 181 are reset to 0 during an initialization procedure such as when the processor is turned on or reset. Each of these bits contains status information as to whether the SO and SK outputs of the microprocessor will be toggled (i.e., made to go high for a prescribed time interval) as follows:

| BIT POSITION | LOGIC LEVEL | STATUS |
| --- | --- | --- |
| B0 | 0 | NOT toggle S0 |

-continued

| BIT POSITION | LOGIC LEVEL | STATUS |
|---|---|---|
| B0 | 1 | DO toggle S0 |
| B1 | 0 | NOT toggle SK |
| B1 | 1 | DO toggle SK |
| B2 | 0 | TOGGLE S0 once (no pilot) |
| B2 | 1 | TOGGLE S0 twice (both pilots OK) |
| B3 | 0 | Not yet delayed twice |
| B3 | 1 | Have delayed twice |

The [2,3] or toggle generation register 182 is employed within the program in FIGS. 3A and 3B for making SO and/or SK go high during operation of the program. In contrast with the other registers here, all of the four bits of the register 182 are set to a binary 1 during the initialization procedure. Operations established by the status of individual bits of the register 182 are as follows:

| BIT POSITION | LOGIC LEVEL | OPERATION |
|---|---|---|
| B0 | 0 | make S0 or SK go high when B0 is reset |
| B0 | 1 | make S0 or SK go low when B0 is set |
| B1 | 0 | no operation |
| B1 | 1 | make S0 and SK go high together on set of B1 |
| B2 | 0 | no operation |
| B2 | 1 | make S0 and SK go high together on set of B2 |
| B3 | 0 | no operation |
| B3 | 1 | make S0 and SK go low together on set of B3 |

The [1,5] register is a four bit count register 183 which is incremented for each detected test pulse on the SI input line 161. The contents of the register 183 is the number of detected test pulses that have been previously counted, not including any overflow. The four bit [1,6] or count overflow register 184 is incremented each time count register 183 overflows and therefore contains an indication of the number of detected test pulses that have already been counted, in multiples of 15 which is the number F in hexidecimal. Thus, the contents of the two registers 183 and 184 must be considered together to determine the total number of detected test pulses that have previously been counted. Both of the count registers 183 and 184 are reset during initialization.

The [1,3] register is a four bit detected test pulse integrity register 185 which is incremented whenever the SI input pulse is high at prescribed time during a given time interval. In operation, a detected test pulse is determined to be present in SI if the count in the [1,3] register is 3 during a particular 20-30 millisecond time interval (program steps 4-19 in FIG. 3A). The register 185 is reset to 0 to make bits thereof a logic 0 during initialization of the microprocessor.

The four bit [1,4] register is an SI end-of-test pulse train register. It stores the number of times that a program in FIGS. 3A and 3B is cycled through ones of the program steps 1 through 23 without detecting a test pulse in SI following detection of at least one test pulse on line 161. More particularly, if at least one of the count registers contains a count and the register 186 contains a count of four, indicating that there has not been a detected test pulse on the SI input line 161 for the past three passes through this part of the program, it is determined that an input stream of test pulses is terminated. The microprocessor then cycles through ones of the program steps 25-65 in FIGS. 3A and 3B for toggling one or both of the output lines SK and SO thereof for performing or initiating prescribed tests.

The operation of the decoder 172 is specified in the following table, where a binary 1 on one of the output lines A, B and C causes the associated switch to close.

| S0 | SK | A | B | C |
|---|---|---|---|---|
| 0 | 0 | 0 | 0 | 0 |
| 0 | 1 | 1 | 0 | 0 |
| 1 | 0 | 0 | 1 | 0 |
| 1 | 1 | 0 | 0 | 1 |

In accordance with one aspect of this invention, ones of the components 101-109 are tested by periodically transmitting different-unique series of 80 kHz test pulses 147 on line 134 to cable 101, each component to be tested and/or test being designated by a different-unique number of test pulses. By way of example, testing of the first cable 101, first repeater 106, second cable 102, and second repeater 107 may be designated by transmitting one, two, three and four test pulses, respectively. In operation, the controller 125 periodically closes switch 133 for 30 millisecond, for example, time intervals for passing the output signal of oscillator 132 onto line 134 to create the selected number of 30 millisecond 80 kHz test pulses 147. The test pulses are blocked by filters in the carrier equipment 112 and the filter 117 and coupled on the input cable 101 to the first repeater. Although the test pulses are blocked from upstream components such as the cable 102 and repeater 107 by the high-pass filter 142 and low-pass filter 154 in the repeater 106, they are passed by filter 158 and detected for producing detected test pulses of a logic-binary 1 on line 161.

The microprocessor 139 is synchronized with the operation of the office computer 120, in the conventional manner, so that it will automatically cycle through ones of the program steps 1 through 60 in FIGS. 3A and 3B during at least certain portions of each time interval TI during which a test pulse 147 may be transmitted by office equipment. After determining that each detected test pulse on line 161 is a valid test pulse (program steps 1-19), the microprocessor counts the number of test pulses SI in step 17. It then tests during successive TI's for the end of a train of test pulses in ones the programs steps 20 through 25 by determining that there is no test pulse present in 3 consecutive time intervals TI during which they may be transmitted.

The microprocessor then subtracts 1 from the test pulse count in registers 183 and 184 in the program steps 26-28. If the remainder in registers 183-184 is 0, (programs steps 29 and 39) indicating that only a single test pulse was transmitted from the office, the microprocessor operates to make output line SK thereof go high for a prescribed time interval such as 30 milliseconds (program steps 40-45). This causes Q1 to turn on for the prescribed time interval for producing a 5 kHz reply pulse on line 178 which is coupled onto the input cable 101 for transmission to the office equipment. Although the 5 kHz reply pulse frequency is within the passband of low-pass filter 154, it is blocked from upstream cables and repeaters by the amplifier 153. If the input cable 101 is unimpaired, this single 5 kHz reply pulse is passed by filter 117, detected and applied to the processor 124.

The processor 124 is responsive to the detected reply pulse for producing a binary output signal on 127 which tells the controller that the input cable is operational and that test pulses can be generated for testing the next component in the system. If a single detected reply pulse is not received within a prescribed time interval that is required for generation and transmission of a replay pulse to the office equipment, the processor produces a binary output signal on line 127 which tells the controller that cable 101 or repeater 106 is faulty. The controller then causes the utilization device 123 to indicate that the input cable 101 is faulty and discontinues further test on the system components.

If after the first subtraction of 1 from the detected test pulse count in registers 183 and 184 the remainder there is not 0, the microprocessor again subtracts 1 from the count registers 183 and 184 in ones of the program steps 26A, 30 and 41. If the remainder in the registers 183 and 184 following the second subtraction is 0 (steps 31-33), then the microprocessor operates for testing the repeater 106 in ones of the program steps 35-38 and 61-65. By way of example, testing of the repeater 106 may comprise checking for the presence of one or more pilot signals at the output node N2 of the high frequency section 135 of repeater 106. Detection of the low and high frequency pilot signals is readily accomplished with bandpass filters and detectors of the circuit 138. If both of the pilot signals are present, the SP output of AND-gate 167 is high for causing the output signal on line S0 to go high during two each successive 30 millisecond time intervals, for example, (steps 35, 36, 38 and 61-65) for turning on Q2 and coupling two each 5 kHz reply pulses on line 179 to the input of the flow frequency section of the repeater 106. If one or both pilot signals are not present at the node N2 of repeater 106, the SP signal is low for causing the microprocessor output line S0 to go high for only a single 30 millisecond time interval (steps 35, 36 and 61-65) for turning on Q2 so as to inject only a single 5 kHz reply pulse at the input of the low frequency section 136 of the repeater. Receipt of two or one or no detected reply pulses by the processor 124 indicates that both the high and low frequency sections 135 and 136 of the repeater 106 are operable, that only the high frequency section 135 is inoperable, and that one or both of the low and high frequency sections of the repeater 106 are inoperable.

If the remainder count in the registers 183 and 184 is some number M after the second subtraction rather than 0 (program steps 26A, 31, 33 and 41) the microprocessor proceeds through many of the program steps 42 through 60 and/or 1 through 3B during M successive time intervals TI for simultaneously causing the SK and SO output signals to go high for 30 milliseconds time intervals. This causes Q3 to conduct for impressing M 80 kHz test pulses on line 180 which are coupled to node N2 and onto the second cable 102 to the next repeater 107. These 80 kHz test pulses on line 180 are blocked from the office equipment by the high-pass and low-pass filters 144 and 152 of the repeaters since all of the repeaters are substantially identical. The aforementioned operation is repeated in the next repeater 107. More specifically, the M test pulses on line 102 are detected and applied as input pulses on the SI input of the associated microprocessor. The detected test pulses are then counted and reduced by one. If the remainder (M−1) is 0, a single 5 kHz reply pulse is outputted from the repeater 107 onto cable 102 and transmitted through repeater 106 and cable 101 to the office equipment. Detection of this reply pulse by circuit 138 tells the processor that the second cable 102 is operating satisfactorily. Conversely, if a detected reply pulse is not received within a prescribed time interval, the processor knows that either the second cable or the second repeater 107 is faulty.

If the remainder count M−1 is not 0, the microprocessor again subtracts 1 from it. If the remainder (M−2) is now 0, the microprocessor is operative for testing the repeater as was previously described. If the remainder count M−2 is not 0, then the microprocessor operates for generating M−2 test pulses that are applied to the other side N4 of repeater 107 for transmission to a subsequent repeater or station equipment for causing similar testing operation as was previously described here. The number of pulses required to test the cable preceeding the last or nth repeater is 2n−1 pulses. There are 2n pulses required to test the nth repeater. If the subscriber station equipment is caused to include circuitry similar to the repeaters, then 2n+2 and 2n+1 pulses are employed to test the subscriber equipment and the length of cable between it and the last or nth repeater.

Although this invention is described in relation to preferred embodiments thereof, variations or modifications are possible. By way of example, numbers which are different values and which are other than 1 may be subtracted from the count of detected test pulses; the remainders remaining after a subtraction can be other than 0 and different values; incrementation of the counts may be by addition rather than subtraction; the numbers of test pulses that are transmitted by the office equipment may be coded to components of the series chain of cables and repeaters rather than be directly related to the progressive numbers of the series elements in the chain; and the microprocessor may operate directly on the numbers of detected test pulses rather than by performing a number of incrementations. Also, other tests may be performed on or in the cable and on repeaters such as checking the signal level at prescribed points in the systems and repeaters and on the cables; monitoring power supply voltages in the repeaters; monitoring the output signal levels of the directional amplifiers in the repeaters; etc. Further, the test and reply frequencies may be other than 5 and 80 kHz. Additionally, the highpass filters 142 and 144 in the repeaters may be bandpass filters having a high frequency cutoff frequency that is below the test frequency. Also, both the test and reply frequency may be between the lower and upper cutoff frequencies of the high-pass and low-pass filters of the repeaters. This method of fault locating may also be used in a PCM carrier system by using A/D and D/A converters at appropriate locations and synchronization. The scope of this invention will therefore be determined from the appended claims rather than from the aforementioned detailed descriptions of preferred embodiments and methods thereof.

What is claimed is:

1. Apparatus for checking for faults in a carrier subscriber communication system having office equipment which is connected in series with pluralities of series connected cables and repeaters and subscriber station terminal equipment, each of which repeaters is connected to one adjacent one of said cables at a first node and to an other adjacent one of said cables at a second node, comprising:

means collocated with said office equipment for transmitting a selected number of test pulses having a first frequency f1 on a first cable to the first node at a first repeater that is closest to said office equipment, said first frequency being outside first and second bandwidths of frequencies that are passed by said repeaters between said office location and subscriber station equipment and vice versa;

means in said first repeater for determining a first number of test pulses that are received at said first node thereof;

first means in said first repeater for incrementing said first number of received test pulses by a first prescribed number to produce a second number of test pulses;

first means in said first repeater for coupling a first predetermined number of reply pulses having a second frequency f2 to said first node of said first repeater for transmission on said first cable toward said office equipment if the second number of test pulses equals a second prescribed number for testing the integrity of said first cable between said first repeater and the office equipment location said second frequency f2 being within said second bandwidth of frequencies that are passed by said repeaters between subscriber station equipment and office equipment;

means at the location of the said office equipment for receiving any reply pulses transmitted over said first cable to said office location for indicating the status of the first cable under test;

second means in said first repeater for incrementing the second number of test pulses by a third prescribed number to produce a third number of test pulses if the second number of test pulses is not equal to the second prescribed number;

means in said first repeater for performing a predetermined test in said first repeater if the third number of test pulses is equal to a fourth prescribed number, which number may be equal to said second prescribed number; and second means in said first repeater for coupling a second predetermined number of reply pulses, which may be equal to said first predetermined number, to one of said first and second nodes of said first repeater for transmission over said first cable to said receiver means for indicating the results of said predetermined test;

said receiving means being operative for determining the number of reply pulses which are received thereby over said first cable for indicating the location of a fault, if any, in said first repeater and/or first cable.

2. Apparatus according to claim 1 further comprising means in said first repeater for coupling M test pulses having said first frequency to said second node of said first repeater for transmission on a second cable to a first node of the adjacent-next repeater that is connected in series therewith if the third number of test pulses is not equal to the fourth prescribed number, where M is related to the third number of test pulses.

3. Apparatus according to claim 2 wherein the architecture of all of said repeaters is substantially the same.

4. Apparatus according to claim 3 wherein said transmitting means is operative for sequentially transmitting ones of a plurality of sets of test pulses on said first cable in response to reply pulses received from said repeaters, each of said sets of test pulses comprising different pluralities of pulses which uniquely define selected ones of said pluralities of cables and repeaters.

5. Apparatus according to claim 3 wherein said office carrier equipment transmits a pilot signal having a frequency in said first bandwidth on said first cable to said repeaters and said performing means performs predetermined test(s) which comprise a test for detecting the transmission of said pilot signal through said first repeater.

6. Apparatus according to claim 5 wherein said second predetermined number of reply pulses is equal to one and other values when said pilot signal is and is not, respectively, detected at the second node of said first repeater.

7. Apparatus according to claim 3 wherein said determining means comprises:

bandpass filter means electrically connected to said first node and operative for passing only said first frequency;

means for detecting the output signal of said bandpass filter means; and means for counting detected test pulses passed by said detecting means.

8. Apparatus according to claim 3 wherein said first and third prescribed numbers are the same values so that said first and second incrementing means increment the associated first and second numbers of test pulses by the same number.

9. Apparatus according to claim 3 wherein said first and second incrementing means increment the associated first and second numbers of test pulses by subtracting assocated first and third prescribed numbers therefrom.

10. Apparatus according to claim 9 wherein the associated first and third prescribed numbers that are subtracted from the associated first and second numbers of test pulses are the same numbers.

11. Apparatus according to claim 10 wherein said second prescribed number is zero.

12. Apparatus according to claim 11 wherein said fourth prescribed number is zero.

13. Apparatus according to claim 12 wherein said first and third prescribed numbers are each the number one.

14. Apparatus according to claim 3 wherein said receiver means comprises bandpass filter means which is operative for passing reply pulses and rejecting test pulse frequencies and carrier channel and pilot frequencies; means for detecting pulses passed by said reply pulse bandpass filter means; and signal processor means responsive to detected reply pulses for indicating whether the cable or the repeater under test is operating satisfactorily and for initiating any further warranted testing of subsequent cables and/or repeaters.

15. In a carrier subscriber communication system comprising pluralities of cables and repeaters that are alternately connected in series between office carrier equipment and subscriber terminal equipment, each of said repeaters being connected to one end of one of said cables at a first node and to the other end of an other of said cables at a second node, apparatus for testing for faults in ones of said repeaters and/or cables comprising;

means collocated with office equipment for selecting one of said pluralities of repeaters and cables to be checked for a fault;

transmission means collocated with office equipment and responsive to operation of said selecting means for transmitting a first predetermined number of test pulses having a first frequency on a first cable to a first repeater that is closest to said office equipment, said first predetermined number corresponding to said selected one of said pluralities of repeaters and cables that is to be tested;

receiver means collocated with said office equipment and operative for receiving reply pulses on the other end of said first cable;

first detecting means in said first repeater for detecting and counting a first number of test pulses that are received at the associated first node;

first means in said first repeater that is responsive to only a first prescribed number count of test pulses detected by said first detecting means for coupling a first number of reply pulses to said first node of said first repeater;

said receiving means being responsive to received reply pulses for indicating whether there is a fault on said first cable;

means in said first repeater that is responsive to only a second prescribed number count of test pulses detected by said first detecting means for preforming predetermined test(s) in said first repeater; and second means in said first repeater for coupling a second number of reply pulses, which may be equal to said first number of reply pulses, to one of said first and second nodes of said first repeater for transmission on said first cable;

said receiver means being responsive to received reply pulses for indicating the results of said predetermined test(s).

16. Apparatus according to claim 15 further comprising means in said first repeater that is responsive to a number of test pulses detected by said first detecting means which is different from said first and second prescribed number counts for coupling a second predetermined number of test pulses, which number is related to the number of test pulses detected by said first detecting means, to said second node at said first repeater for transmission to the next-adjacent repeater.

17. Apparatus according to claim 16 further comprising:

means collocated with said office equipment for transmitting a pilot signal through said repeaters and cables;

second detecting means in said first repeater which is responsive to the second prescribed number count of detected test pulses for detecting the presence of said pilot signal at said second node of said first repeater; and third means in said first repeater which is responsive to an output of said second detecting means indicating the presence or absence of said pilot signal at said second node of said first repeater for coupling third and fourth numbers, respectively, of reply pulses to one of said first and second nodes of said first repeater.

18. Apparatus according to claim 17 wherein said receiving means comprises:

third detecting means collocated with said office equipment for detecting reply pulses that are received at the other end of said first cable; and means responsive to the operation of said selecting means and the time and/or number of reply pulses detected by said third detecting means for indicating from the absence of one or more expected reply pulses the presence of a fault in a selected one of said repeaters and cables.

19. Apparatus according to claim 18 wherein said first frequency is outside first and second bandwidths of frequencies that are passed by said repeaters between office and subscriber station equipment and vise versa, respectively, and said second frequency is within said second bandwidth of frequencies that are passed by said repeaters between subscriber station and office equipment.

20. Apparatus according claim 18 wherein each of said repeaters is structurally at least substantially the same.

* * * * *